United States Patent [19]

Hansen et al.

[11] Patent Number: 5,490,932
[45] Date of Patent: Feb. 13, 1996

[54] FLUID TREATMENT VALVE SYSTEM WITH NOZZLE DRIVEN TURBINE

[75] Inventors: Christopher L. Hansen, Newbury; Stuart L. Park, Burton, both of Ohio

[73] Assignee: Kinetico Incorporated, Newbury, Ohio

[21] Appl. No.: 222,077

[22] Filed: Apr. 1, 1994

[51] Int. Cl.$^6$ ................................. B01D 17/12
[52] U.S. Cl. .................. 210/541; 137/624.14; 210/98; 210/141; 210/190; 251/59; 415/150
[58] Field of Search ........................ 210/98, 141, 190, 210/269, 418, 662, 137, 541; 251/59; 415/150, 154.1; 137/624.14, 332

[56] References Cited

U.S. PATENT DOCUMENTS

| | | | |
|---|---|---|---|
| Re. 18,909 | 8/1933 | Turner | 251/59 |
| 137,171 | 3/1873 | Bloch | 415/154.1 |
| 337,670 | 3/1886 | Davis et al. | 219/98 |
| 716,791 | 12/1902 | Upson | 415/154.1 |
| 894,105 | 7/1908 | Beale et al. | 251/59 |
| 2,803,310 | 8/1957 | Parsons | 251/59 |
| 3,891,552 | 6/1975 | Prior et al. | 210/88 |
| 4,298,025 | 11/1981 | Prior et al. | 137/624.14 |
| 4,427,549 | 1/1984 | Brown et al. | 210/662 |
| 5,022,994 | 6/1991 | Avery et al. | 210/679 |

Primary Examiner—Joseph W. Drodge
Attorney, Agent, or Firm—Watts, Hoffmann, Fisher & Heinke

[57] ABSTRACT

A control valve for a water treatment system which includes a turbine rotatably mounted within a water receiving chamber. A pair of nozzles communicate water from a water receiving chamber to the turbine in a driving relationship. The nozzles each define a passage, preferably converging slightly in cross-section and defining centerlines that converge and intersect at a region swept by the turbine. Preferably, the intersection of the centerlines occurs intermediate a circle defined by central regions of the turbine blades and a circle defined by peripheral edges of the turbine blades. At least one of the nozzles is slidably held in a slot formed in a dividing wall forming part of the control valve and is replaceable by a plug. A confronting surface defines a uniform gap between an outlet side of the nozzles and a peripheral portion of the turbine. In a further embodiment, the nozzle receiving slot includes a slot extension through which water can flow into the receiving chamber, bypassing the nozzle in proportion to the flow passing the nozzles.

22 Claims, 6 Drawing Sheets

FLUID TREATMENT VALVE SYSTEM WITH NOZZLE DRIVEN TURBINE

TECHNICAL FIELD

The present invention relates generally to fluid treatment and in particular to an improved control system and control device for controlling a fluid treatment apparatus.

BACKGROUND ART

U.S. Pat. No. 4,298,025, which is owned by the present assignee, discloses a control valve for use in water softeners having two resin tanks. One of the resin tanks is normally on-line while the other tank is regenerated and placed in a standby condition until the first tank requires regeneration. The disclosed control valve controls which of the tanks is on-line and controls the regeneration sequence of an exhausted tank.

The quantity of water treated by a given tank, is monitored by a mechanism that includes a water usage turbine driven by water entering the on-line resin tank. When a predetermined quantity of water is treated, which produces to a predetermined number of revolutions in the turbine, a regeneration sequence is initiated which places the standby tank on-line and isolates the exhausted tank.

A second turbine, operatively connected to a regeneration sequence control element (in the form of a disk) is rotated by a stream of water that is activated at the beginning of the regeneration cycle. The stream of water physically drives the regeneration control disk (via the turbine and associated drive train) through its sequence. With the disclosed arrangement, the frequency of regeneration of the water softener system is determined by the usage turbine which directly measures the quantity of fluid treated by a given tank.

In U.S. Pat. No. 4,427,549 which is also owned by the present assignee, a deionization method and apparatus is disclosed. The disclosed apparatus includes a control valve similar to the control valve disclosed in U.S. Pat. No. 4,298,025 in that it includes a usage turbine for monitoring the amount of source water treated by a given tank and a regeneration control turbine for driving a control element through a regeneration sequence.

The control valves disclosed in U.S. Pat. Nos. 4,298,025 and 4,427,549 channel all water to be treated past the water usage turbine. For the valves disclosed in these patents, the flow rate is sustainable through the valve is in large measure determined by the flow rate that is sustainable through the passages conveying the water to pass the water usage turbine. Attempts have been made to improve the flow rate of the types of control valves disclosed in the above-identified patents. For example, U.S. Pat. No. 5,022,994, which is also owned by the assignee of the present invention, discloses a control valve in which the water usage turbine may be eliminated in the valve disclosed in this patent, an external triggering device is used to initiate regeneration at frequencies dependent on water usage monitored by external devices or by sensors which monitor the quality of the water leaving the treatment apparatus. When the sensor detects a drop in quality, regeneration is initiated.

The past efforts at increasing the flow rates through this type of control valve have been costly or have required the use of external devices connected to external power. The control valves disclosed in the '549 and '025 patents do not require external power. All valving within the valve is operated by water pressure.

DISCLOSURE OF INVENTION

The present invention provides a new and improved control valve for controlling a fluid treatment apparatus such as a deionization system or a water softener. In the illustrated embodiment, the improved control valve is used to control a fluid treatment system having a pair of resin tanks, one of which is on-line, while the other is regenerated and held in a standby condition. The disclosed control valve, although similar to the control valves described in U.S. Pat. Nos. 4,298,025 and 4,427,549, which are hereby incorporated by reference, includes an improvement which enables it to sustain a much higher flow rate as compared to prior art valves of this type.

According to the invention, the control valve includes a water usage turbine rotatably mounted within a turbine chamber. Preferably the turbine chamber communicates with an outlet of the control valve. The turbine includes a plurality of vanes. First and second nozzles are located within the control valve and are configured to direct water into an impinging relationship with blades of the turbine. At least one of the nozzles may be replaced by a plug for applications in which high flow rates are not desired or necessary.

According to a feature of the invention, each nozzle defines a passage having a centerline. In the preferred embodiment, the centerlines of the passages defined by the nozzles intersect in a region swept by the turbine blades. In a more preferred embodiment, the intersection of the centerlines occurs between a circle defined by center regions of the turbine blades and a circle defined by the peripheral edges of the turbine blades.

In the exemplary embodiment, passages defined by the nozzles are substantially square or rectangular in cross-section. In addition, one or both passages may converge slightly from an inlet to an outlet. When the nozzles are mounted within the control valve, a uniform outlet surface is defined which provides a relatively constant gap between the nozzle structure and the turbine blades in a region bounded by the nozzle passages.

A fuller understanding will be obtained and additional features of the invention will become apparent in reading the following detailed description made in connection with the accompanying drawings.

BEST MODE FOR CARRYING OUT THE INVENTION

The present invention is adaptable to a wide variety of applications. It may be used in connection with a water softening apparatus such as that shown in U.S. Pat. No. 3,891,552, as well as other types of treatment apparatus, such as deionization systems an example of which is illustrated in U.S. Pat. No. 4,427,549. To facilitate the description of the invention, however, the invention will be described in connection with a water softening system. It should be understood, however, that this description is not meant to limit the scope the present invention or to preclude its applicability to other types of water treatment apparatus.

Figure 1:
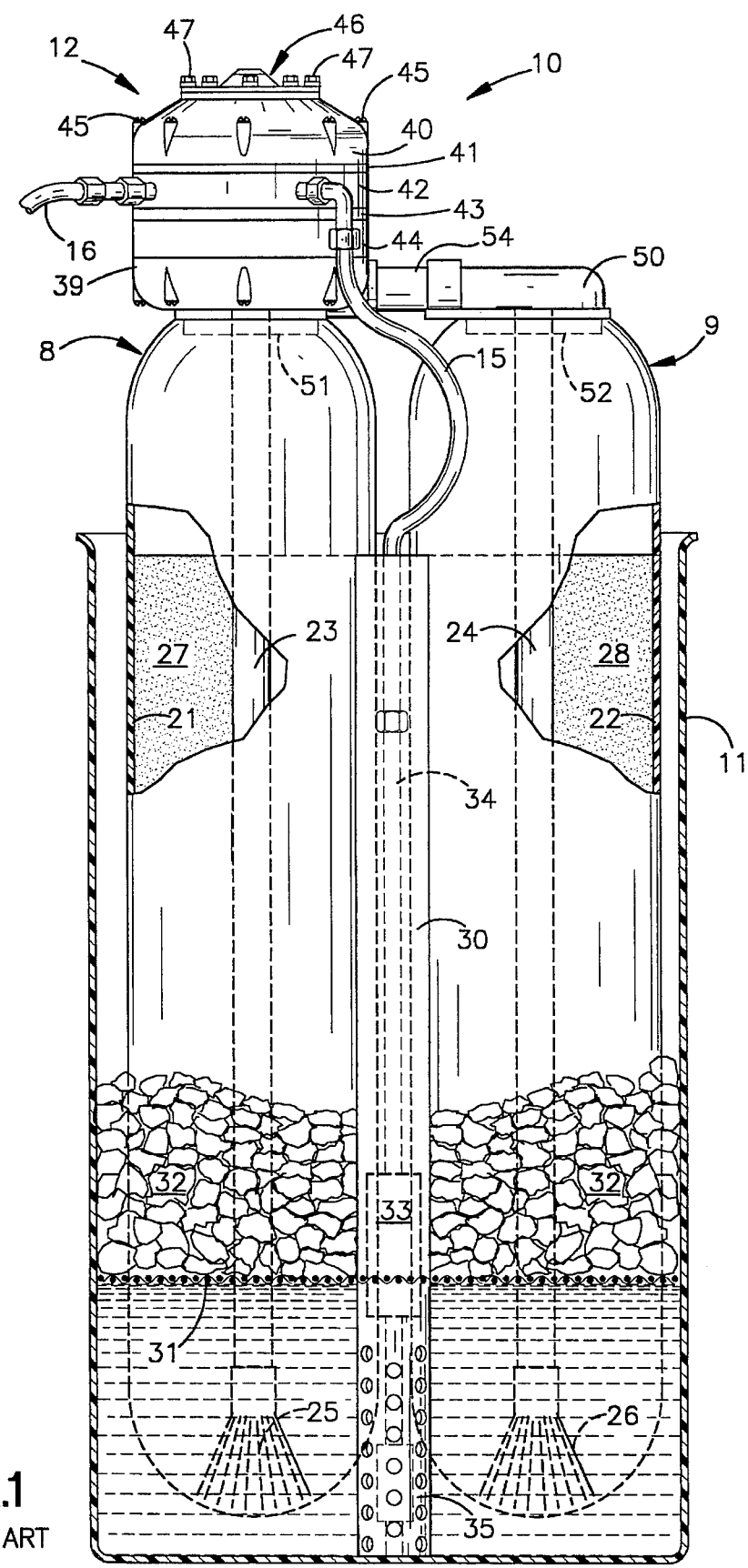
FIG. 1 is a side elevational view, partly in section, of a water softener employing a control valve of the present invention.

Referring to FIG. 1, a water softener 10 includes a pair of softener tanks 8, 9 positioned upright in an open-top brine tank 11. A valve assembly 12 is supported atop the tanks 8, 9. The valve assembly 12 is operative, as will be explained, to selectively maintain one of the tanks 8, 9 on-line with a household water supply system. The off-line tank is subjected to a regeneration cycle and then held off-line until the on-line tank is exhausted. The valve assembly 12 controls the regeneration process.

Figure 2:
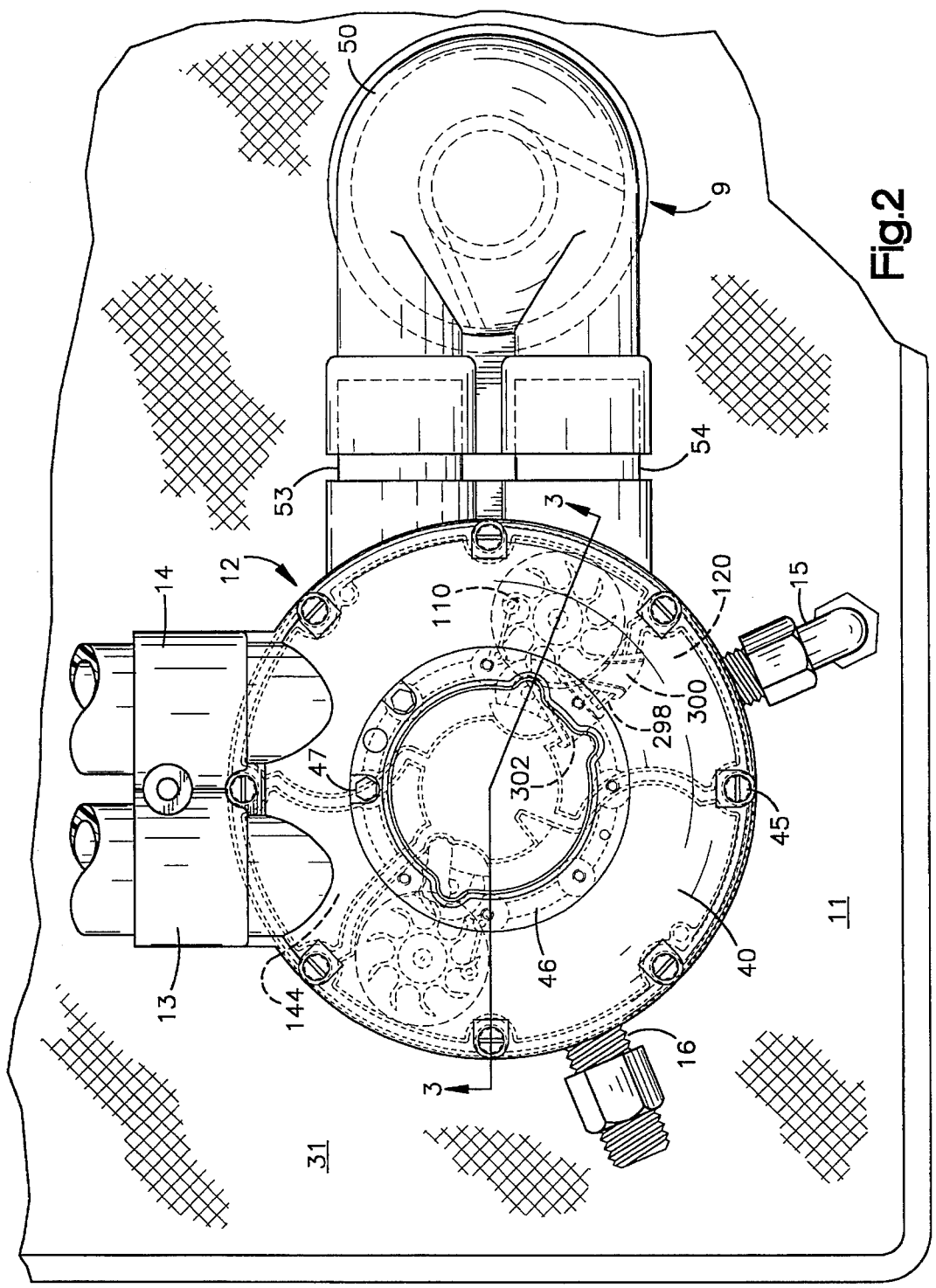
FIG. 2 is a plan view of the control valve shown in FIG. 1.

Referring also to FIG. 2, four conduits communicate with the valve assembly 12. Hard water is delivered to the valve assembly 12 through an inlet conduit 13. Softened water is discharged from the valve assembly 12 through an outlet conduit 14. Brine from the brine tank 11 is admitted to the valve assembly 12 through a brine conduit 15. Waste water from the regeneration cycle is discharged from the valve assembly through a drain conduit 16.

The softener tanks 8, 9 are of known configuration and utilize common water softening chemicals. The tanks 8, 9 typically include cylinders 21, 22 of glass fiber construction which may be about 7 inches in diameter and 35 inches in length. The upper ends of the cylinders 21, 22 are threaded with female 2½ inch NPT threads for connection to the valve assembly 12. Riser pipes 23, 24 depend centrally through the cylinders 21, 22. A pair of screens 25, 26 communicate with the lower ends of the riser pipes, 23, 24. Suitable ion-exchange softening chemicals, indicated by the numerals 27, 28, are positioned in the cylinders 21, 22 surrounding the riser pipes 23, 24 and the screens 25, 26.

The water softening process takes place as water passes through the tanks 8, 9. Hard water is channeled into the cylinders 21, 22 and is softened during its passage downward through the chemicals 27, 28. Softened water enters the riser pipes 23, 24 through the screens 25, 26 and is directed back out of the cylinders 21, 22.

The brine supply system is of known configuration and may utilize common ion replacement salts to regenerate the softening chemicals 27, 28.

A screen 31 extends horizontally in the brine tank 11 in regions around the softener tanks 1, 2 and around the brine well 30. The screen 31 is positioned about six inches up the wall of the brine tank 11. Granular or pelletized salt material 32 is deposited in the brine tank 11 and rests atop the screen 31.

A brine control valve 33 of known configuration is positioned in the brine well 30. The valve 33 includes a pipe 34 which is connected at its upper end to the brine conduit 15. The lower end of the pipe 34 communicates with a valve assembly 35 which serves the dual functions of admitting a regulated amount of brine solution from the brine well 30 to the pipe 34 when the water softener establishes a suction in the brine conduit 15, and of admitting a regulated amount of softened water to the brine well 30 from the pipe 34 when the brine conduit 15 is connected to a source of pressurized softened water.

The valve assembly 12 includes a stacked array of four disc-like members 41, 42, 43, 44 interposed between a base member 39 and a top member 40. Threaded fasteners 45 extend through aligned holes in the top and disc members 40–44 and are received in threaded holes formed in the base member 39 to clamp the members 39–44 together. A cover assembly 46 overlies portions of the top member 40 and is held in place by threaded fasteners 47.

A tank connector 50 is provided to the right of the base member 39 as viewed in FIGS. 1 and 2. Threaded depending necks 51, 52 are formed on the base member 39 and on the tank connector 50 for connection with the softener tanks 8, 9. A pair of conduits 53, 54 establish communication between the base member 39 and the tank connector 50. Hard water is delivered from the base member 39 through the conduit 53 and through the tank connector 50 to the softener tank 9. Softened water from tank 9 is returned through the tank connector 50 and through the conduit 54 to the base member 39.

Except for the disc member 40 and its associated components, the construction and operation of the remaining portions of the valve assembly 12 are substantially identical to that disclosed in U.S. Pat. No. 3,891,552, which is hereby incorporated by reference. By way of summary, the stacked members 41, 42, 43, 44 and base member 39, together house a plurality of servo valves which control the communication of the tanks 8, 9 with the brine solution in the tank 11 and with the inlet and outlet conduits 13, 14. Movement in the servo valves is achieved by the selective application of pilot pressures to piston chambers associated with each servo valve. The communication of these pilot pressures to the piston chambers is determined by a servo control mechanism housed in the member 40 that is constructed in accordance with the present invention.

Figure 3:
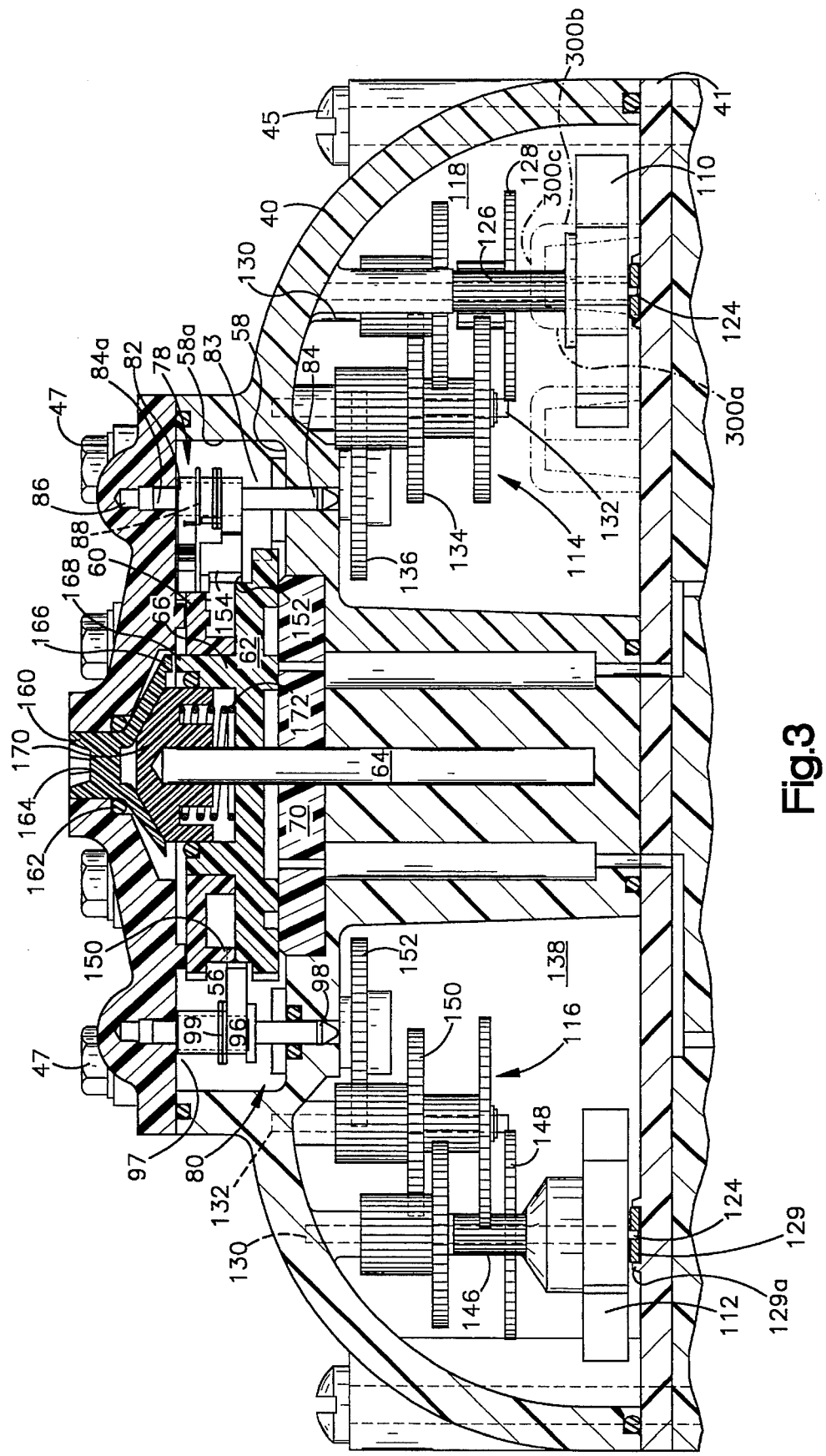
FIG. 3 is a cross-sectional view of the control valve as seen from the plane indicated by the line 3—3 in FIG. 2.
Figure 4:
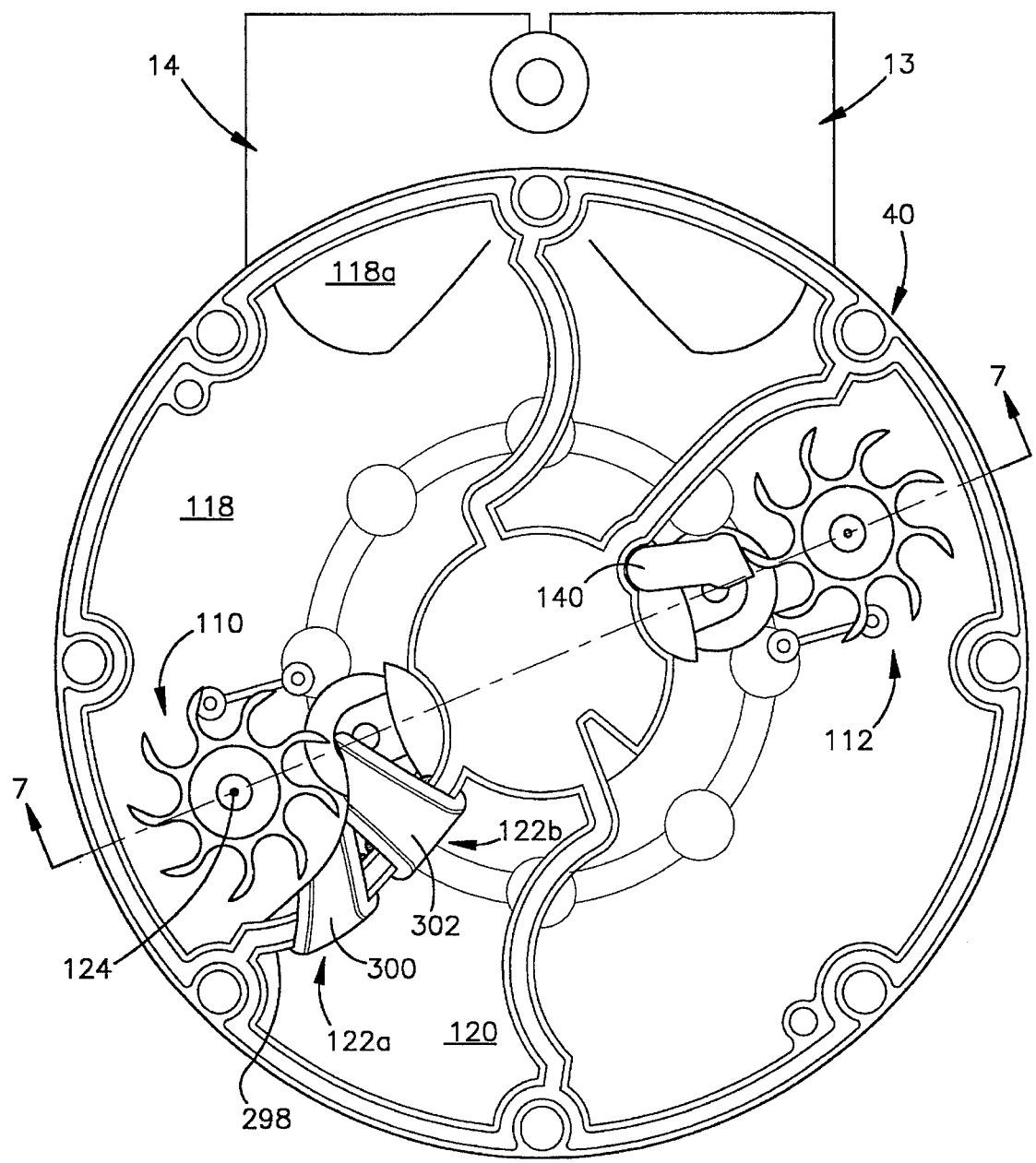
FIG. 4 is a cross-sectional view of the control valve as seen from the plane indicated by the line 4—4 in FIG. 3.
Figure 5:
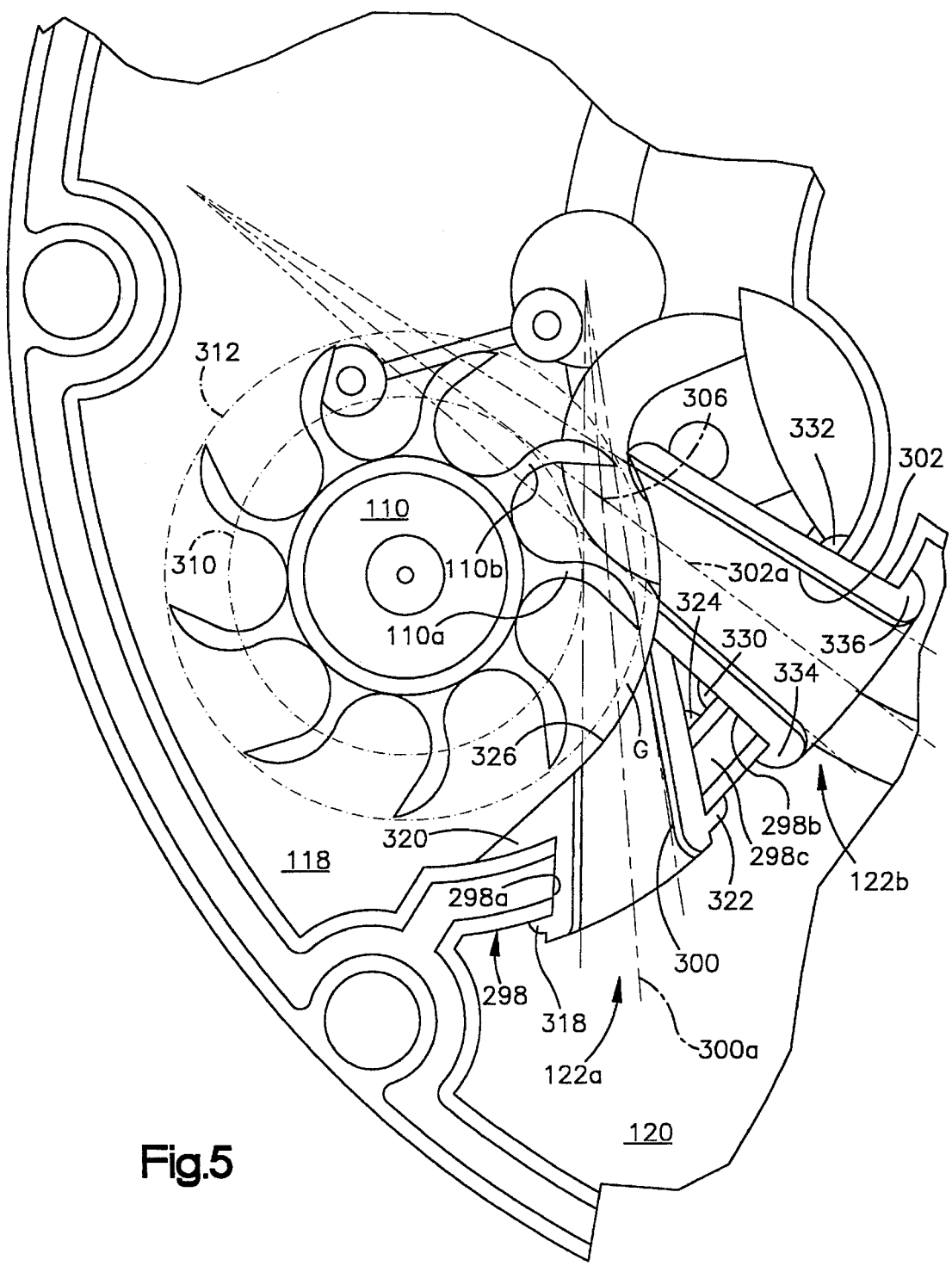
FIG. 5 is an enlarged fragmentary view of the control valve shown in FIG. 4.

Referring also to FIGS. 3–5, the servo control mechanism is located in an enclosed chamber 56 defined by a recess 58 in the top member 40 and the cover assembly 46 which overlies the recess. The servo control mechanism includes a pair of concentrically positioned discs 60, 62, each disc having perimetrically disposed ratchet teeth 60a, 62a, respectively. An upwardly extending stub shaft 64 defines an axis of rotation for the discs. The lower disc 62 is journaled on the shaft 64 and includes a hub 66 (shown in FIGS. 3 and 5) which rotatably supports the upper disc 60.

The upper disc 60 was usually designated as a water usage monitor disc in the control valves disclosed in the above identified patents and its movement was a function of the amount of softened water discharged by the water control valve assembly 12 through the outlet 14. In the present invention, the water usage disc 60 controls the regeneration frequency based on the quantity of fluid treated. The lower disc 62 is a regeneration control disc and its movement controls the regeneration sequence for an exhausted softener tank after a regeneration cycle is initiated by the water usage disc.

As explained in greater detail in U.S. Pat. No. 3,891,552, the regeneration control disc 62 rotates in confronting contact with a disc-like, non-rotatable insert 70, positioned in the bottom of the recess 58. The insert includes a plurality of ports which communicate with piston chambers that operate the servo valves through pilot pressure passages integrally formed in the various members of the control valve assembly 12.

In the preferred embodiment, the water usage and regeneration control discs 60, 62 are incrementally rotated by an indexing arrangement in the form of ratchet drives 78, 80. The ratchet drive 78 comprises a pair of pawls 82, 83 journaled and co-driven by an eccentric shaft 84. The upper end 84a of the shaft 84 is located by a bore 86 in the top cover assembly 46 (see FIG. 3). A spring 88 acting between a side wall 58a of the recess 58 urges the pawls 82, 83 towards the peripheral ratchet teeth 60a, 62a of the water usage and regeneration control discs 60, 62, respectively. A fixed, resiliently biased pawl 94 also engages the ratchet teeth of the upper disc 60 and prevents reverse rotation.

The ratchet drive 80 comprises a pawl 96 journaled an driven by an eccentric shaft 98 and urged toward engagement with the regeneration control disc 62 by a spring 99 acting between the side wall 58a and the pawl 96.

Referring to FIGS. 2, 3 and 5, the eccentric shafts 84, 98 which upon rotation produce the necessary reciprocating motion in the ratchet drives 78, 80 are coupled to regeneration initiating and regeneration control turbines 110, 112 by reduction gear trains, indicated generally by the reference characters 114, 116, respectively. The water usage turbine 110 (if used) and associated gear train are located in an outlet chamber 118 defined by the top member 40 and the upper disc member 41 that communicates with the outlet conduit 14 via passage 118a (shown in FIG. 4).

According to the invention, softened water is delivered to the outlet chamber 118 from a softened water collection chamber 120 by way of nozzles 122a, 122b (shown best in FIG. 5). The flow of softened water to the collection chamber 120 from the softener tanks 8, 9 is controlled by servo valves housed in the lower portions of the control valve assembly 12 and described fully in the above referenced patents. The nozzles 122a, 122b direct softened water from the collection chamber 120 to the turbine blades 110 and thus any softened water discharged through the control valve causes attendant rotation in the water usage turbine.

The water usage turbine 110 is rotatably supported by a downwardly extending shaft 124 and includes an integrally formed pinion gear 126 that drives a first reduction gear 128. The shaft 124 for supporting the turbine 110 is stabilized by bearing 129 which is held within a recess defined by a circular projecting wall 129a formed in a top surface 41a of the control valve member 41. A plurality of cascading reduction gears are journaled on spaced shafts 130, 132. A final reduction gear 134 mates with an input gear 136 fixed to the end of the eccentric shaft 84.

The regeneration control turbine 112 and associated gear train is located in an overflow or drain chamber 138 defined by the top member 40 and the upper disc member 41. During a regeneration cycle, a controlled flow of softened water is discharged through a regeneration control nozzle 140 located in close proximity to the regeneration turbine 112 so that the discharged fluid impinges on the turbine blades to cause rotation in the turbine 112. The fluid leaving the turbine blades leaves the overflow chamber through a port 142 that communicates with the drain conduit 16.

The incoming hard water is delivered to an inlet chamber 144 through the inlet conduit 13. The inlet chamber 144 is defined in part by the top member 40. The communication of the incoming hard water to one or both of the tanks 8, 9 is controlled by inlet valves described and discussed in the above referenced patents.

The regeneration control turbine 112 includes an integrally formed pinion gear 146 that drives a first reduction gear 148. A cascading gear train is in turn driven by the first reduction gear 148. A final reduction gear 150 mates with an input gear 152 fixed to the end of the eccentric shaft 98 that journals the pawl 96. Thus, rotation of the regeneration turbine during a regeneration cycle is translated to reciprocating motion in the pawl 96 which in turn causes incremental movement in the regeneration control disc 62.

A more complete description of the regeneration process including the treatment steps that are controlled by the regeneration control disk 62 is more fully described in U.S. Pat. Nos. 3,891,552 and 4,298,025, both of which are hereby incorporated by reference. It should also be noted, that a description of the regeneration cycle, controlled by a control disk when forming part of a deionization process is more fully disclosed in U.S. Pat. No. 4,427,549, which is also incorporated by reference.

Turning specifically to FIGS. 4 and 5, the construction and orientation of the nozzles 122a, 122b are most clearly illustrated. Both nozzles 122a, 122b extend through a dividing wall 298 which is integrally formed in the cover or top member 40 of the control valve 12. The dividing wall 298 at least partially defines the softened water collection chamber 120 and the water usage turbine chamber 118.

The nozzle 122a includes a channel-like passage 300 that converges slightly from an inlet side 301a to an outlet side 301b. In the preferred embodiment, the passage 300 is substantially square or rectangular in cross-section (best shown in FIG. 3). Similarly, the nozzle 122b defines a slightly converging channel-like passage 302 which is also substantially rectangular or square in cross-section.

In the preferred embodiment of the invention, the nozzles 122a, 122b define respective center lines 300a, 302b that intersect at a point designated by the reference character 306. In addition, the nozzles are arranged such that the water discharged by the nozzles 300, 302 impinges on substantially adjacent turbine blades, for example, turbine blades 110a, 110b, respectively. As seen in FIG. 5, the centers of each turbine blade lie on a circle indicated by the dashed circle 310. The peripheral edges of the turbine blades lie on a circle 312. In the preferred and illustrated embodiment, the center line intersection point 306 is located substantially intermediate the circles 310, 312. With this configuration, the rotational speed of the turbine is proportional to the flow rate of water discharge through the nozzle 122a, 122b and a linear relationship is substantially maintained for both low and high volume flow rates.

According to another feature of the invention, one or both nozzles 122a, 122b are captured in slots 298a, 298b defined by the dividing wall. In the preferred embodiment, the nozzle 122a is received in a slot 298a which is sized to substantially conform to the periphery defined by three sides 300b, 300c, 300d (shown in FIG. 3) of the nozzle 122a. The nozzle includes extensions 318, 320, 322, 324 which abutably engage sides of the dividing wall 298 and maintain the nozzle in its operative position. According to this feature of the invention, for some applications, the nozzle 122a may be replaced by a plug 328 (shown in FIG. 5 that is sized to fit within the slot 298a and which then becomes part of the dividing wall. When the plug 328 is used, only the nozzle 122b directs fluid flow at the turbine 110. With this construction, a given control valve may be used for multiple applications. For example, for a very low flow rate application, only a single nozzle may be necessary and preferred. For high volume applications, the second nozzle 122a is substituted for the plug and further modifications to the valve in order to enable the valve to sustain high volume flow rates, are not needed. The plug and the nozzle 122a may be secured in position by adhesive or other means. In addition, the sliding engagement may be retained, since once the valve is assembled, clamping of the cover 40 to the disc member 41 fixes the position of the nozzle preventing its dislodgement.

The nozzle 122b, in the preferred embodiment, is held in the slot 298b in the same way that the nozzle 122a is held in the slot 298a. In particular, the slot 298b is sized to substantially conform to the periphery defined by three sides of the nozzle 122b. The nozzle includes extensions 330, 332, 334, 336 which abuttably engage sides of the dividing wall 298 and maintain the nozzle in its operative position.

According to another feature of the invention, the outlet sides of the nozzles 122a, 122b define a substantially uniform arcuate leading surface 326. As seen best in FIG. 5, a clearance gap G is defined between the periphery of the turbine 110 and the outlet surfaces of the nozzles that is substantially uniform in the region bounded by the channels 300, 302. In order to assure efficiency, the gap between the periphery of the turbine and the nozzle should be both minimal and uniform.

Figure 6:
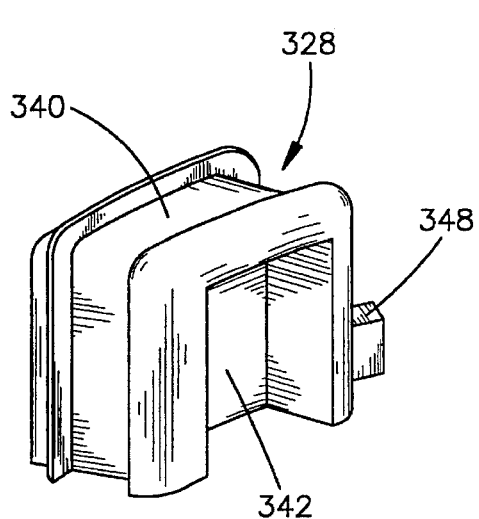
FIG. 6 is an enlarged perspective view of a plug constructed in accordance with the invention; and, FIG. 7 is a cross-sectional view as seen from the plane indicated by the line 7—7 in FIG. 4 with components removed.

Turning now to FIG. 6, the construction of the plug 328 which may be substituted for the nozzle 122a is illustrated. As seen in FIG. 5, the plug includes a three sided channel 340 which is sized to fit within and conform to the slot 298a forming the dividing wall 298. The plug also includes a flow blocking panel 342, integrally formed with the plug 328 which blocks the flow of water into the receiving chamber 118. The plug may also include a sealing tab 348 which is designed to fit into the O-ring groove segment 298c of the dividing wall 298. The lug eliminates the need for a separate O-ring seal piece mounted within the O-ring groovelike segment 298c.

Figure 7:
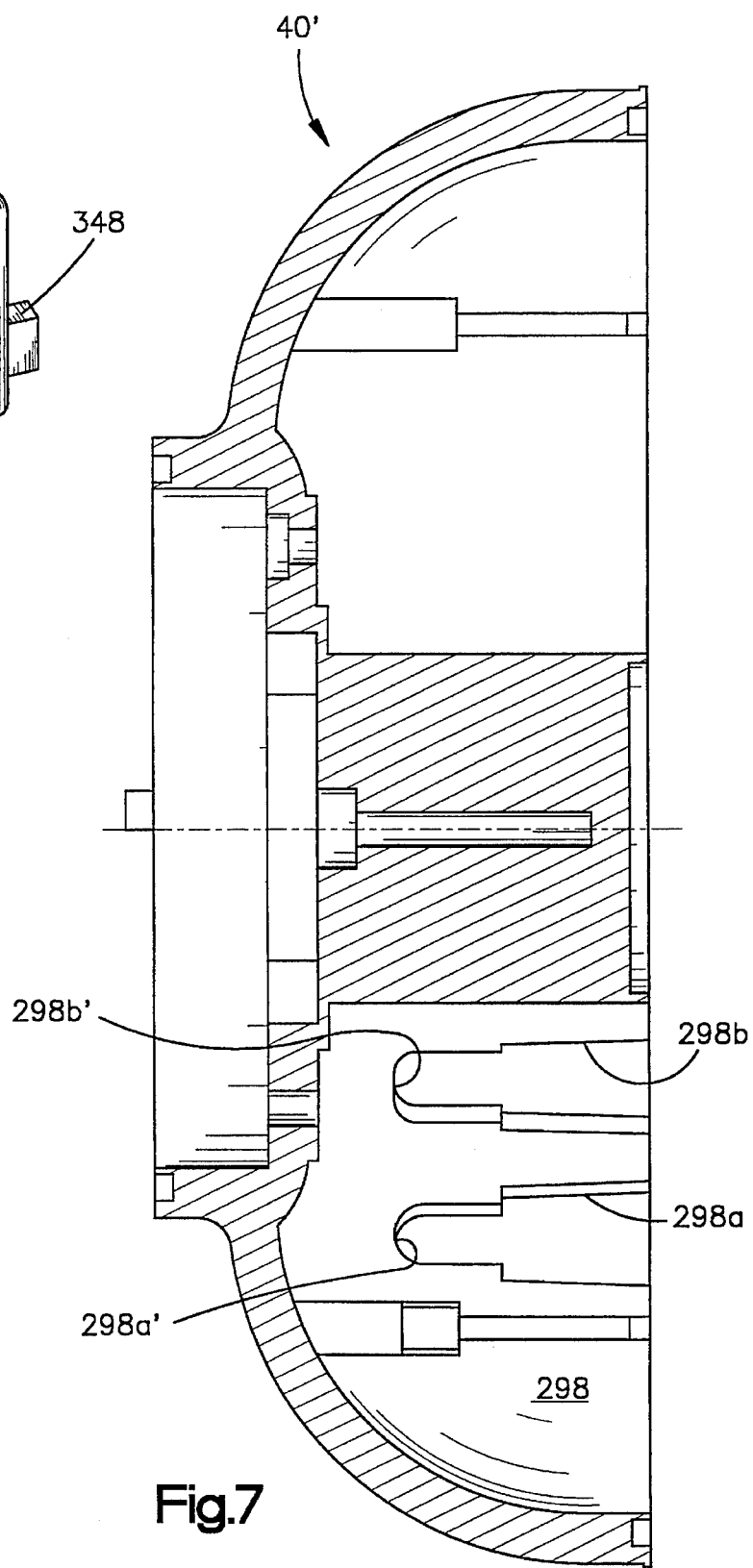

Turning now to FIG. 7, another embodiment of the invention is illustrated. In this embodiment, a top member 40' includes means for further increasing the flow rate of water through the valve. For purposes of explanation, structure in the top member 40' which is identical to structure in the top member 40 shown in FIG. 2 will be identified by the same reference characters. In this embodiment, the dividing wall 298 includes elongate slot extensions 298a' and 298b'. As seen in FIG. 7, the extensions 298a' 298b' provide a flow path of water through the dividing wall 298 above the nozzle slots 298a, 298b. Since, as explained above, the flow rate of water through the control valve is determined by the cross sectional area of the nozzles 122a, 122b, the flow rate that is sustainable from the chamber 120 in to the chamber 118 is increased by virtue of the slot extensions 298a', 298b'.

It has been found in practice that the flow rate of water through the slot extensions is proportional to the flow rate of water through the nozzles. Since only the water traveling through the nozzles impinges on the water usage turbine 110, the gearing between the turbine 110 and the regeneration control can be selected to adjust for the water that has bypassed the nozzles and has entered the outlet chamber 118 via the slot extensions 298a', 298b'. In other words, frequency of regeneration can be maintained in accordance with the amount of water flowing into the receiving chamber 118, even though some of the water entering the chamber 118 bypasses the usage turbine 110. The drive relationship between the turbine 110 and a water usage disk (which is driven by the water usage turbine) is adjusted in order to compensate for the water that does not flow past the water usage turbine. The specifics of the components which couple the water usage turbine 110 to the water usage disk are more fully explained in U.S. Pat. Nos. 4,298,025 and 3,891,552,  both of which have been previously been incorporated by reference.

Although the invention has been described with a certain degree of particularity, it should be understood that those skilled in the art can make various changes to it without departing from the spirit or the scope of the invention as hereinafter claimed.

We claim:

1. A control valve for controlling a water treatment apparatus, the improvement comprising:

a) a water usage turbine rotatably mounted within a water receiving chamber, said turbine including a plurality of vanes;

b) a first nozzle for directing water flowing along a first path, into an impinging relationship with vanes of said turbine;

c) a second nozzle for directing water flowing along a second path into an impinging relationship with said vanes concurrently with said first nozzle, when said second nozzle is operative;

d) structure within said chamber for mounting a plug member, said plug member when mounted in said control valve being operative to block the flow of water along said second path whereby all water is caused to flow through said first nozzle.

2. The apparatus of claim 1 wherein a centerline of one nozzle intersects a centerline of said other nozzle in a region swept by said turbine vanes.

3. The apparatus of claim 2 wherein said centerlines intersect intermediate a region defined by a periphery of said turbine vanes and a circle defined by a center region of each turbine vane.

4. A control valve assembly for controlling a water treatment system, comprising:

a) a water usage turbine rotatably mounted within a water receiving chamber, said turbine including a plurality of vanes;

b) first and second nozzles for concurrently directing water into a driving relationship with said turbine;

c) each of said nozzles including a passage defining a centerline and constructed such that said water exits said respective passages along said centerlines of said passages into said turbine, said centerlines of said passages intersecting in a region swept by said turbine.

5. The apparatus of claim 4 wherein one of said nozzles is replaceable by a plug.

6. The apparatus of claim 5 wherein said passages in said nozzles are substantially square in cross-section.

7. The apparatus of claim 4 wherein said nozzles jointly define a confronting surface on an outlet side of said nozzles which forms a substantially constant gap between said nozzles and said turbine vanes in a region bounded by said passages.

8. The apparatus of claim 4 wherein said water usage turbine is rotatably mounted on a shaft, one end of which is rotatably supported by a bearing button held in a recess formed by a circular projecting wall integrally formed in a portion of the control valve assembly.

9. A control valve assembly for controlling a water treatment system such as a water softener or deionization apparatus, comprising:

a) a water usage turbine having a plurality of vanes and rotatably mounted within a turbine chamber, said turbine chamber communicating with an outlet for treated water;

b) first and second nozzles for concurrently communicating water from a collection chamber to said turbine vanes in a driving relationship;

c) each of said nozzles including a passage having a centerline extending toward vanes on said turbine in a converging relationship and intersecting in a region swept by said turbine vanes; and d) outlet end surfaces of said nozzles defining a confronting surface uniformally spaced from a peripheral portion of said turbine, said surface being continuous along a region bounded by said passages.

10. The apparatus of claim 9 wherein at least one of said passages converges in cross-section from an inlet side to an outlet side.

11. A control valve assembly for controlling a water treatment system such as a water softener or deionization apparatus, comprising:

a) a water usage turbine having a plurality of vanes and rotatably mounted within a turbine chamber, said turbine chamber communicating with an outlet for treated water;

b) first and second nozzles for communicating water from a collection chamber to said turbine vanes, in a driving relationship;

c) each of said nozzles including a passage having a centerline extending toward vanes on said turbine in a converging relationship and intersecting in a region swept by said turbine vanes;

d) outlet sides of said nozzles defining a confronting surface uniformally spaced from a peripheral portion of said turbine, said surface being continuous along a region bounded by said passages; and, e) at least one of said nozzles being slidably held in a slot defined by a dividing wall in said control valve, said nozzle including structure for maintaining its position within said control valve after said control valve is assembled.

12. The apparatus of claim 11 wherein said one nozzle is replaceable by a plug.

13. The apparatus of claim 12 wherein said plug includes a channel-like recess adapted to engage said nozzle slot and further including a sealing tab for engagement with sealing structure forming part of said control valve assembly.

14. A control valve for controlling a water treatment apparatus, the improvement comprising:

a) a water usage turbine rotatably mounted within a water receiving chamber, said turbine including a plurality of vanes;

b) first and second nozzles for directing water in an impinging relationship with vanes of said turbine;

c) one of said nozzles being held in a slot formed in a dividing wall, said slot including a slot extension extending beyond a nozzle receiving region of said slot and allowing the flow of water into said water receiving chamber by way of said slot extension, thereby bypassing said nozzle.

15. The apparatus of claim 14 wherein each of said nozzles is held in a slot defined in a dividing wall and each of said slots includes a slot extension through which water can flow into said water receiving chamber, thereby bypassing said nozzles.

16. The apparatus of claim 15 wherein said water usage turbine is rotatably coupled to a regeneration frequency control, by a drive mechanism, said drive mechanism arranged to compensate for water that enters into said water receiving chamber by way of said slot extensions.

17. A control valve for controlling a water treatment apparatus, the improvement comprising:

a) a water usage turbine rotatably mounted within a water receiving chamber, said turbine including a plurality of vanes;

b) a dividing wall at least partially defining said water receiving chamber and an adjacent water collection chamber;

c) at least one slot formed in said wall adapted to receive a nozzle for directing water in an impinging relationship with vanes of said turbine;

d) a slot extension extending from said nozzle receiving slot, arranged to permit the flow of water directly from said collection chamber into said water receiving chamber whereby said nozzle is bypassed;

e) a drive mechanism coupling said water usage turbine with a regeneration frequency control, adapted to compensate for water that has entered said water receiving chamber through said slot.

18. The apparatus of claim 17 wherein said dividing wall defines a second slot for receiving a second nozzle through which water from said water receiving chamber can flow into said water collection chamber in an impinging relationship with said turbine.

19. The apparatus of claim 18 wherein said second slot also includes a slot extension through which water can flow directly from said water collection chamber to said water receiving chamber.

20. The apparatus of claim 16 wherein said drive mechanism is a ratchet drive.

21. The apparatus of claim 16 wherein said drive mechanism is a gear drive.

22. A control valve for controlling a water treatment apparatus, the improvement comprising:

a) a water usage turbine rotatably mounted within a water receiving chamber, said turbine including a plurality of blades;

b) a first nozzle for directing water flowing along a first path, into an impinging relationship with blades of said turbine;

c) structure operative for mounting either a plug member or a second nozzle in said control valve, said second nozzle operative to direct water flowing along a second path into an impinging relationship with said blades concurrently with said first nozzle, when said second nozzle is mounted;

d) said plug member, when mounted in said control valve in place of said second nozzle, being operative to block the flow of water along said second path whereby all water is caused to flow through said first nozzle.

* * * * *